Figures 1, 2:
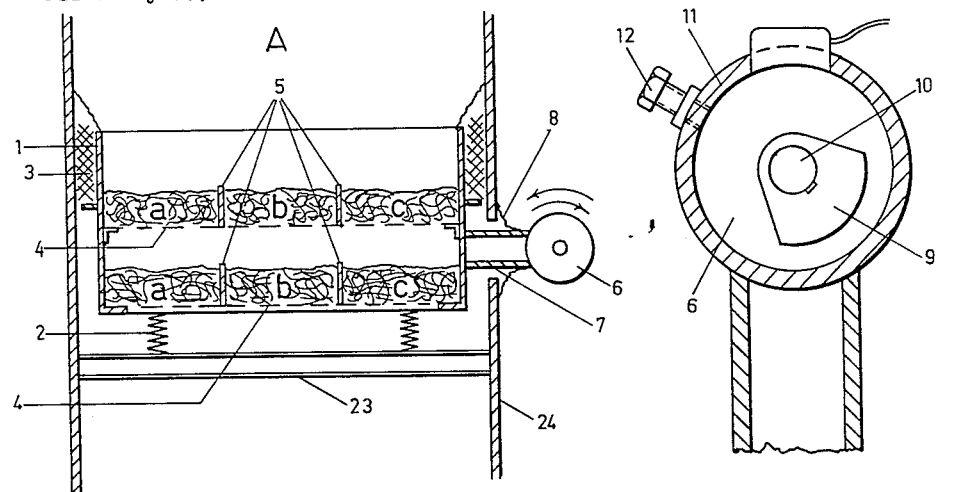

May 21, 1963 M. BERZ ETAL 3,090,180
DEVICE FOR CLEANING DUST-LADEN GASES
Filed May 19, 1960 2 Sheets-Sheet 1

Max & Wolfgang Berz
INVENTORS.

BY *Mestern, Ross & Mestern*

May 21, 1963     M. BERZ ETAL     3,090,180
DEVICE FOR CLEANING DUST-LADEN GASES
Filed May 19, 1960     2 Sheets-Sheet 2

Max & Wolfgang Berz
INVENTORS.

BY Mestern, Ross & Mestern

United States Patent Office 3,090,180
Patented May 21, 1963

3,090,180
DEVICE FOR CLEANING DUST-LADEN GASES
Max Berz and Wolfgang Berz, both of 7 Bayerlandstr., Kochel am See, Germany
Filed May 19, 1960, Ser. No. 30,181
Claims priority, application Germany Oct. 25, 1955
1 Claim. (Cl. 55—282)

The invention relates to a device for cleaning gases containing dust. In particular, this device will free dust-laden industrial waste gases of all kinds from their dust. This application is a continuation-in-part of application Ser. No. 617,416, filed on October 22, 1956, by the same applicants, now abandoned.

Exhaust gases at high temperatures or containing moisture can also be treated with the device.

The device is able to take up even high concentrations of dust from 200 to 300 grams per cubic meter in the untreated gas, the dust content of the purified gas being under 0.100 gram per cubic meter.

Despite this high efficiency of separation, passage of the gases through the filtration means requires only a slight pressure differential of a few millimeters of water column.

The process of filtration in the device takes place in two steps. In one phase, the dust is retained in the filtration means. In the other phase of the cycle, the stream of gas is interrupted and the filtration means in the device is completely freed from dust by being set in vigorous oscillatory motion.

Known filtration means are used, such as loose material of various kinds, for example ceramic packing, silica, or, if there are several layers, a combination of loose material and gravel.

The invention further relates to a freely movable box in the form of a four-sided frame in which several gas-permeable screen surfaces are installed at any desired spacing. On these screen surfaces in the box, the filtration means are spread out in a uniform layer. Several layers may be provided one above another, and each of these layers may be reserved for different kinds of bulk material. Vertical partitions may be set up on the screen surfaces. These partitions divide the layer into separate sections. In each section, the layer may differ from the neighboring layer in depth or in size of grain.

By this special method of charging the chambers, a very uniform distribution of gas over the entire entrance area can be achieved even in the case of very large filter chambers measuring several square meters in cross section.

The said partitions produce another novel effect when a vibrating motion is imparted thereto. During such an operation, granular material will shift in the direction of the stresses incurred and become excessively compressed at certain points, impeding the transit of gas. The partitions installed within the screen entirely eliminate this disadvantage, the layer being subdivided into smaller areas.

The layer of packing material is periodically freed from accumulated dust by means of a vibrating operation. The vibrators used may be of the kind with horizontal direction of impact, or electric-motor vibrators with unbalanced rotation, imparting a circular or elliptical motion to the packing material.

There are known devices for cleaning dust-laden gases that employ filter cloth or granular material as filtration means. It is also known that filter cloth may be stretched on a freely movable, horizontal frame, and the dust adhering to the filter cloth knocked off by a beater mechanism.

Such devices for removing dust from dust-bearing gases are limited in application because filter cloth cannot be used for gases at elevated temperatures, above 150° C. In the case of moist gases, the interstices in the filter cloth will clog and stop the passage of gas.

Another disadvantage of such devices is that any dust penetrating to the top of the filter cloth will stick and fail to be evacuated downwards by a beater mechanism.

The use of granular material enclosed between two screen surfaces as filtration means is known. However, removal of dust adhering to the filtration means is effected outside the device, usually by hand.

Our improved apparatus for cleaning dust-bearing gases eliminates the disadvantages of such known devices and represents a substantial advance in the art of dust removal. The advantages of the device according to the invention will be illustrated below. All kinds of exhaust gases, even at high temperatures, can be treated in the device; moisture in the gases will not clog the filtration means, these being strongly agitated during the reconditioning phase; several layers of filtration means may be arranged above one another in a single freely movable box, all layers being cleaned jointly by a single vibrating operation; all layers of packing material are cleaned at once inside the device in the freely movable box, without replacement or renewal of filtration material; during the vibrating operation, the packing particles execute a vigorous movement along the screen surface, so that the individual grains clean one another; in this way, it becomes possible to free the filtration means completely from adhering dust; after the process of reconditioning by vibrating the box, a very even surface of packing layer is obtained, thus ensuring uniform gas permeation through the entire area of the layer; partitions divide the layer of packing into several chambers so that the loosened condition of the layer of packing material is kept uniform at all times, including the period after the vibrating operation.

The device according to the invention will now be more fully described with reference to the accompanying drawing, but it should be understood that the same is given by way of illustration and not of limitation and that many changes in the details may be made without departing from the spirit of the invention.

Figure 5:
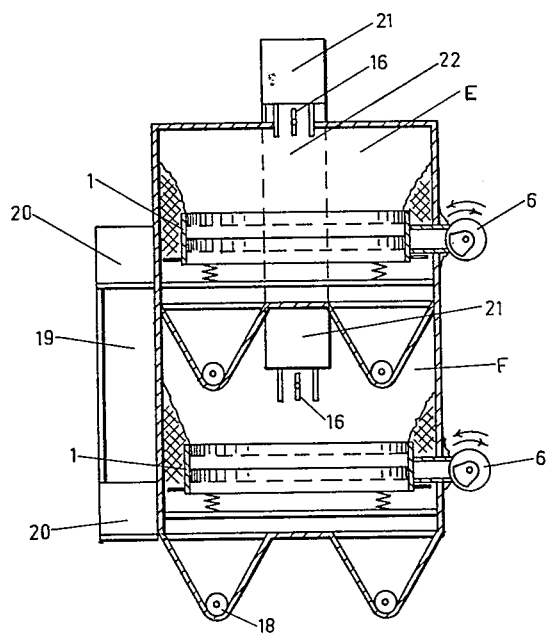
Figure 4:
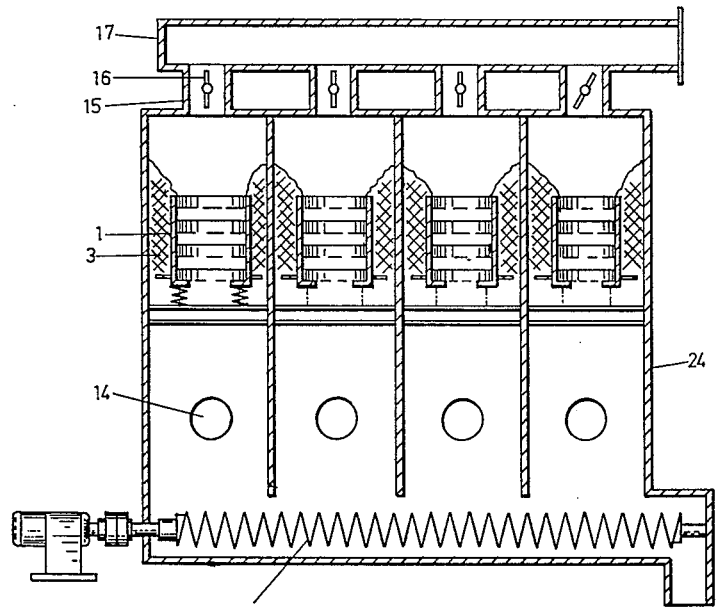
Figure 3:
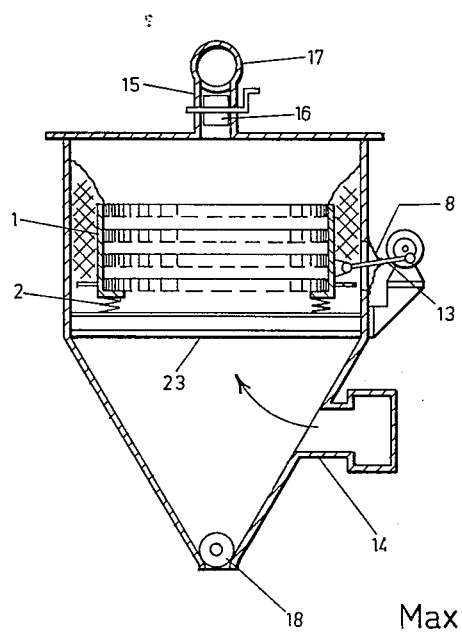

In the drawing:
FIG. 1 shows a section through a filter chamber;
FIG. 2 shows a section through a vibrator motor;
FIG. 3 shows a section through a filter housing;
FIG. 4 shows a longitudinal section of a filter; and
FIG. 5 illustrates a large-scale embodiment.

As shown in FIG. 1, a filter chamber A forming an air shaft is fitted with a freely movable sheet-metal box 1 supported at four points by springs 2. The coil springs 2 are, in turn, carried by a support 23 secured to the vertical chamber walls 24. An elastic seal 3 is provided around the box. The box has mounted therein, two gas-permeable screen elements 4 on which bulk material is spread out as filtration means and forms an even surface. The space over the screens, especially if of large area, may be subdivided by partitions 5 into sections $a$, $b$, $c$.

As a vibrator, an unbalanced motor 6 is connected to the box. It is rigidly attached to its frame by means of a pipe 7. Elastic sealing material 8 serves to exclude outside air.

The mode of operation of the device is as follows:

Dust-laden exhaust gases are drawn through the two filter layers during the first phase of the cycle referred to above. The dust catches in the interstices and the cleaned air emerges above. The surface being even, a uniform distribution of gas over the entire cross section is achieved.

The operation of cleaning the filter during the aforementioned second phase is performed as follows. The stream of gas is shut off automatically by means of a valve (16, FIGS. 3–5). The imbalance of the motor generates oscillations upon the springs 2, whereby the entire filter contents of box 1 are set in motion. The motion of each particle of filtering material results in a complete cleaning of all layers of filtration means by a single vibrator.

The dust shaken out drops through all the layers and is removed from the device by known conveyor means (18, FIGS. 3–5).

According to FIG. 2, a motor 6 with eccentric weight 9 mounted on the ends of its shaft 10 is fitted into a pipe 11 and secured against rotation by means of a screw 12. By adjusting the rotational speed and the size of the unbalancing weight, any desired amplitude of motion may be imparted to the filtration means.

The filter housing of FIG. 3 contains a freely movable box 1 containing four layers of filter material. The vibrating means is an eccentric drive with crank 13 connected to the wall of the box, so that the adjustable vibration energy is transmitted through the box to all four layers uniformly. The box 1 may be either supported on springs 2 or suspended from similar springs.

The dust-laden gas passes through inlet port 14 into the hopper of the filter and is drawn or blown through the four superposed layers. Dust particles accumultae in the interstices of the filtration means, and clean gas emerges into the chamber from the surface of the uppermost layer. The chamber is surmounted by a valve in an outlet port 15, constituted by a damper 16, so that the chamber may be shut off temporarily from the manifold 17 for cleaning the filter by the aforedescribed vibration process.

During the vibrating operation, dust drops from all four layers into the hopper below and is evacuated by a conveyor means 18.

The four layers may be charged with any desired bulk material. It is especially efficient to charge the two bottom layers with steel chips and the two top layers with different granular material.

FIG. 4 shows a filter with four chambers. In each of these chambers there is a freely movable box 1 with four layers of filter material. Around each box there is an elastic seal 3, and each box is supported by springs 2. Each chamber has a gas inlet 14 and a valve 16 in an associated outlet port 15 of the cover, all the ports 15 leading to a manifold 17 forming part of an external gas-circulation system. A screw conveyor 18 removes the dust from all the chambers to the outside. The dampers 16 can be independently closed, as shown for the chamber on the right in FIGURE 4, during oscillation of the respective filter box.

The large-scale embodiment of FIG. 5 has two superposed filter housings E and F. Each housing contains a filter box 1 having several screen surfaces covered with bulk material. Dusty air is supplied through a passage 19 and distributed to the entrances 20 to the filter boxes. After passage through the screens into the boxes 1, the cleaned air is collected in passages 21 and carried off by a duct 22. The vibrating operation to clean the filters is performed by unbalanced motors 6, individual to the boxes 1, while individual dampers 16 enable the blocking of the gas circulation through either filter housing during its oscillatory phase as described hereinabove.

What we claim is:

A device for the purification of dust-laden gases, comprising an enclosure with upright walls forming at least one substantially vertical air shaft; an inlet port at the bottom of said air shaft and an outlet port at the top of said air shaft, said ports constituting part of a circulation system for gases to be purified; support means in said air shaft below said outlet port; a set of upstanding coil springs rising from said support means within said air shaft; a horizontal frame oscillatably supported on said coil springs and disposed in said air shaft between said inlet and outlet ports with peripheral clearance from said wall; vibrator means coupled with said frame for intermittently imparting oscillatory motion thereto; a plurality of screens horizontally spanning the interior of said frame with mutual separation one above the other; a plurality of particulate filtering layers respectively carried on said screens for successive permeation by said gases, said layers including a lower layer composed essentially of metal chips and an upper layer composed essentially of granular material; flexible sealing means disposed in said clearance for preventing the passage of said gases around said frame; and control means in said system for discontinuing the circulation of said gases during said oscillatory motion.

References Cited in the file of this patent

UNITED STATES PATENTS

| | | |
|---|---|---|
| 213,151 | Washburn | Mar. 11, 1879 |
| 812,218 | Lowe | Feb. 13, 1909 |
| 1,095,676 | Rigg | Mar. 5, 1914 |
| 1,131,543 | Orr | Mar. 9, 1915 |
| 1,480,399 | Kling et al. | Jan. 8, 1924 |

FOREIGN PATENTS

| | | |
|---|---|---|
| 2,737 | Great Britain | July 9, 1878 |
| 9,718 | Germany | Apr. 8, 1879 |